United States Patent [19]

Gabrielle

[11] Patent Number: 5,673,036
[45] Date of Patent: Sep. 30, 1997

[54] SELECTIVE CALL RECEIVER MEMORY VALIDATION AND ACKNOWLEDGEMENT AND METHOD THEREFOR

[75] Inventor: Paula Christine Gabrielle, Fort Lauderdale, Fla.

[73] Assignee: Motorola, Inc., Schaumburg, Ill.

[21] Appl. No.: 411,372

[22] Filed: Mar. 27, 1995

[51] Int. Cl.$^6$ .................................................. H04Q 7/12
[52] U.S. Cl. .................................. 340/825.44; 340/311.1; 379/56; 455/57.1; 455/70
[58] Field of Search .................... 340/311.1, 825.44, 340/825.47, 825.52, 825.69; 364/705.05; 379/56, 57; 455/49.1, 57.1, 67.7, 70, 38.2, 38.4, 343

[56] References Cited

U.S. PATENT DOCUMENTS

| | | | |
|---|---|---|---|
| 4,839,641 | 6/1989 | Mori et al. | 340/825.47 |
| 4,891,637 | 1/1990 | Siwiak et al. | |
| 5,025,252 | 6/1991 | DeLuca et al. | 340/825.44 |
| 5,124,697 | 6/1992 | Moore. | |
| 5,381,138 | 1/1995 | Stair et al. | 340/825.44 |
| 5,396,660 | 3/1995 | Cannon | 340/825.44 X |
| 5,414,418 | 5/1995 | Andros, Jr. | 340/825.47 X |
| 5,463,382 | 10/1995 | Nikas et al. | 340/825.44 |

*Primary Examiner*—Michael Horabik
*Assistant Examiner*—William H. Wilson, Jr.
*Attorney, Agent, or Firm*—James A. Lamb

[57] ABSTRACT

Method and apparatus in a selective call system for storing received messages in at least one receiving unit having memory and for processing a command to validate memory (358) when the receiving unit is idle, or the receiving unit is processing received messages, or when a central control unit is waiting for acknowledgement of a previously sent message. The method further includes detection of a corrupted memory (360), followed by erasure of the received messages (362) stored in memory and transmitting a "failed memory" acknowledgment signal (366). The method further comprises a step of receiving a reproduction of all of the received messages (370) erased by the receiving unit, or a reproduction of the most recently sent message, or a reproduction of the previously sent message for which the central control unit is waiting an acknowledgement.

18 Claims, 4 Drawing Sheets

SELECTIVE CALL RECEIVER MEMORY VALIDATION AND ACKNOWLEDGEMENT AND METHOD THEREFOR

FIELD OF THE INVENTION

This invention relates in general to a method and apparatus for performing memory validation. More particularly, this invention relates to a method and apparatus for performing memory validation on personal messaging units which would not interfere with the message receiving operation and would allow recovery of any messages deleted during a validation failure.

BACKGROUND OF THE INVENTION

In current paging systems, paging signals are transmitted from a paging transmitter of a central control unit to a multiplicity of portable paging receivers, also known as selective call receivers or personal messaging units (PMUs), according to a prespecified modulation format including, for example, serialized digitally coded synchronization signal, address, and message data words. PMUs generally include a memory module (i.e., RAM) for storing the received messages for instant or delayed playback.

In order to insure proper functioning of this memory, PMUs are usually programmed to perform memory validation operations on the external RAM. The memory validation operation checks the integrity of message memory by performing conventional tests on the links between the message memory blocks which may have been corrupted due to electrostatic discharge (EDS), for example. Usually, if an error is detected in the external RAM, the PMU is programmed to automatically delete all of the messages and re-build the memory pool.

A major problem connected with memory validation is that when performing the memory validation operations, the PMU is unable to receive messages, since PMUs generally turn off their signal processor during memory validation operations. The "off-line" period is usually greater than three seconds for PMUs with large message memory to avoid serious message overrun (i.e., entire messages missed or sections of messages missed) if the PMU happens to be receiving large or multiple messages during this off-line period. In order to avoid turning off the signal processor, some systems scale back the memory validation to be able to perform the memory validation in less than three seconds. However, this scaled back memory validation may be inadequate. The short time period allocated to perform the validation operation is oftentimes insufficient and messages may be missed. For PMUs with smaller message memory, memory validation may not take as long, but there is still the risk of missing messages. PMUs are usually programmed to perform memory validation operations during a predetermined off-peak hour to lessen the chance of message interference. However, since there is no guaranteed time period in which messages are not being sent, even during off-peak hours, messages may be missed.

Another problem encountered by receive-only paging devices when performing validation of message memory is that there is no way for the central control unit to know about the validity of a PMU's memory. Therefore, if there was a failure in the validation, not only would the user lose the deleted messages, the central control unit would not be able to reconstruct or re-send any of these deleted messages.

One solution to these problems would be to provide a method for performing memory validation without the risk of missing entire messages or sections of messages. Another solution would be to provide a method for the central control unit to be able to reconstruct or re-send any deleted messages after a failure of memory validation. A further solution would be to allow validation to occur only when it is absolutely guaranteed that no messages are being sent.

Thus, there is a need in the art for a method and apparatus for performing memory validation which would not interfere with the message receiving operation of personal messaging units and would allow recovery of any deleted messages should the validation fail.

DESCRIPTION OF THE PREFERRED EMBODIMENT

Figure 1:
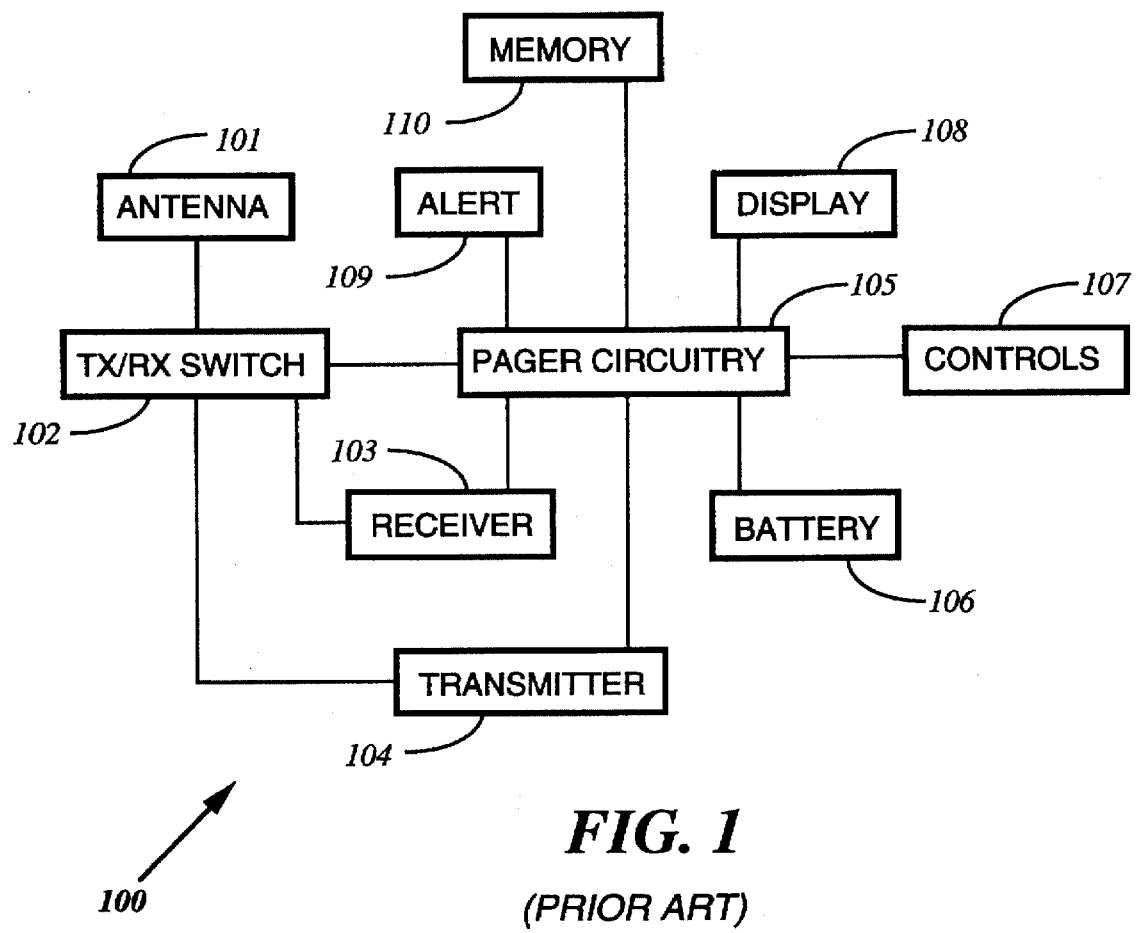
FIG. 1 is a block diagram of a conventional two-way selective call receiver.
Figure 2:
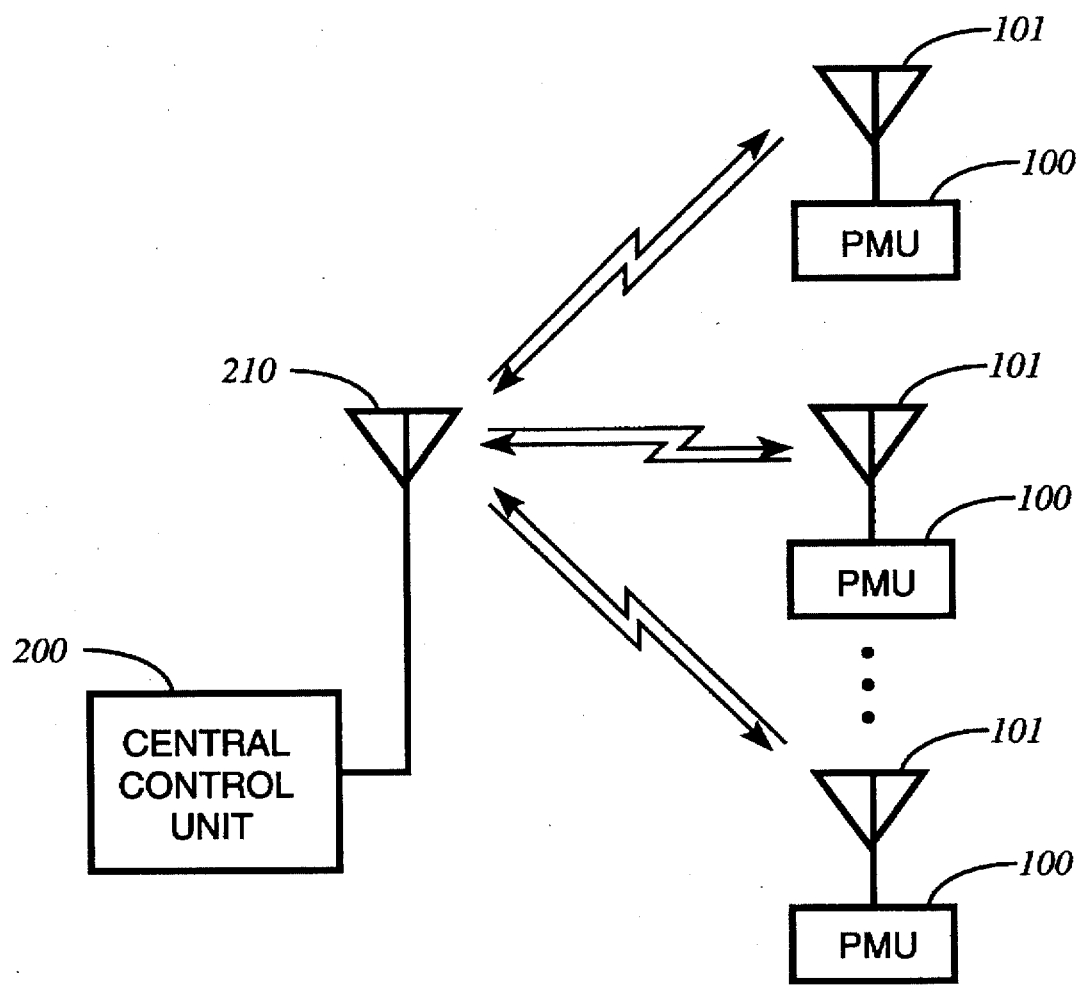
FIG. 2 is a block diagram of a paging system, including the central control unit and personal messaging units.

Referring initially to FIGS. 1 and 2, the present invention generally provides a paging system in which paging signals are transmitted from paging transmitter(s) 210 directed by a central paging terminal or central control unit (CCU) 200 to a multiplicity of portable paging receivers, also known as personal messaging units (PMUs) 100. A novel transmission signal protocol is used which includes a command to direct a particular PMU 100 to perform memory validation. Each PMU 100 includes an input stage which receives and demodulates the transmission signal. The microprocessor of the PMU 100 can then interpret the transmission and perform memory validation if so instructed.

For two-way pagers, the PMU 100 can notify the central control unit 200 of the results of the validation. Two-way pagers, also known as "Acknowledge-back" (ack-back) pagers, are those selective call receivers that not only can receive but also can transmit (automatically and/or manually) an acknowledgment/reply signal in response to receiving their selective call address or a message. An example of such a pager is described in U.S. Pat. No. 4,891,637 to Siwiak et al. and U.S. Pat. No. 5,124,697 to Moore, each assigned to the assignee of the present application, incorporated herein by reference and generally described below.

The components of a battery powered 106 selective call receiver (PMU) 100, as shown in FIG. 1, generally include an antenna 101 coupled through a transmit/receive switch 102 to either a transmitter 104 or a receiver 103. The receiver 103 generally comprises a combination of filters, mixers and oscillators. The receiver 103 demodulates the received signals using conventional techniques and forwards the demodulated signal to the pager circuitry 105, which decodes and recovers information contained within the received signal. In accordance with the received information and the user controls 107, the selective call receiver (PMU) 100 presents at least a portion of the information using a display 108 (or equivalent) and signals the user via a sensible alert 109 that a message has been received. The selective call receiver (PMU) 100 further includes a transmitter 104 so as to transmit an acknowledge signal on one or more acknowledge channels.

Most paging transmission formats include a digitally coded word (e.g., sync word) to synchronize the operation of the various paging receivers to the digitally coded address words transmitted successfully thereafter in a transmission cycle. Paging receivers (PMUs) are customarily preprogrammed with the slot of the sync word and the slot in which the corresponding address is expected to be transmitted with respect to the sync word. In the preferred embodiment of the present invention, a transmission protocol would be used which further includes a special slot for an instruction from the central control unit to direct the PMU to perform memory validation. Those skilled in the art will recognize that the preferred format may be used in conjunction with conventional synchronous or asynchronous paging protocols which allow for such a special slot.

After receiving a message, ack-back pagers allow for acknowledge-back data to be transmitted. The user may input the data into the PMU 100 by a variety of conventional means. Alternately, the PMU 100 may automatically send certain messages back to the central control unit 200. The microprocessor in the paging circuitry 105 supplies binary output data from output port to the input port of a digital to analog (D/A) converter. The output signal is then passed to the transmitter 104 for processing and transmission.

Generally, in a selective call system, having at least one receiving unit (PMU) 100 having memory 110 for storing received messages, the method for performing validation of the memory 110, includes the steps of 1) receiving by the receiving unit (PMU) 100 a control transmission signal including a command directing the receiving unit (PMU) 100 to perform validation of the memory 110; and 2) performing memory validation of the memory 110 by the receiving unit (PMU) 100 in response to the command.

Specifically, the invention comprises a control transmission signal which includes a new "Command to PMU" vector instruction in the protocol. This command will allow scheduling of an appropriate time to perform memory validation, unlike to prior systems in which validation may be performed at an inappropriate time. With this instruction in the protocol the particular PMU 100 can perform validation when it is not processing messages, since the central control unit 200 controls the sending of messages. Alternatively, the central control unit 200 can direct the PMU 100 to perform memory validation when the central control unit 200 is not waiting for a response from the PMU 100. This will protect the user from missing a message entirely due to message over-run. In this scenario, the central control unit 200 is aware of the traffic to the PMU 100 and can schedule this operation appropriately.

Accordingly, the control transmission signal may be transmitted when the receiving unit (PMU) is idle, when the receiving unit (PMU) is processing the received messages, or when a central control unit 200 is waiting for an acknowledge signal for a previously sent message.

Since a two-way paging device can report the validity of the message memory to the central control unit 200, the central control unit 200 will be aware of a particular PMU's validation results. Therefore, when the memory validation detects corrupted memory, the validation process further includes the steps of erasing the received messages stored in the memory 110, and transmitting by the receiving unit (PMU) a failed memory acknowledge signal. The PMU 100 can then recover from a failure in memory validation, since the central control unit 200 can re-send the erased messages. Specifically, the PMU 100 can receive a subsequent transmission signal from the central control unit 200, wherein the subsequent transmission includes a reproduction of all of the received messages erased by the receiving unit (PMU) 100, a reproduction of a most recently sent message, or a reproduction of the previously sent message of which the central control unit 200 is waiting for the acknowledge signal. This can be extremely important when an appropriate time cannot be found to perform validation and it must be executed during a busy condition. A failure in validation may cause the automatic deletion of a message in which the user intends to respond. In this case, the central control unit 200 can re-send messages which have pending responses and/or messages which were recently sent.

Upon failure, the central control unit 200 will also know that it is free to re-use any signature since there will be no messages in the PMU due to the automatic deletion and rebuilding of the free memory pool. This is advantageous because there will be no possibility of duplicate signatures responding to the central control unit 200.

Figure 3:
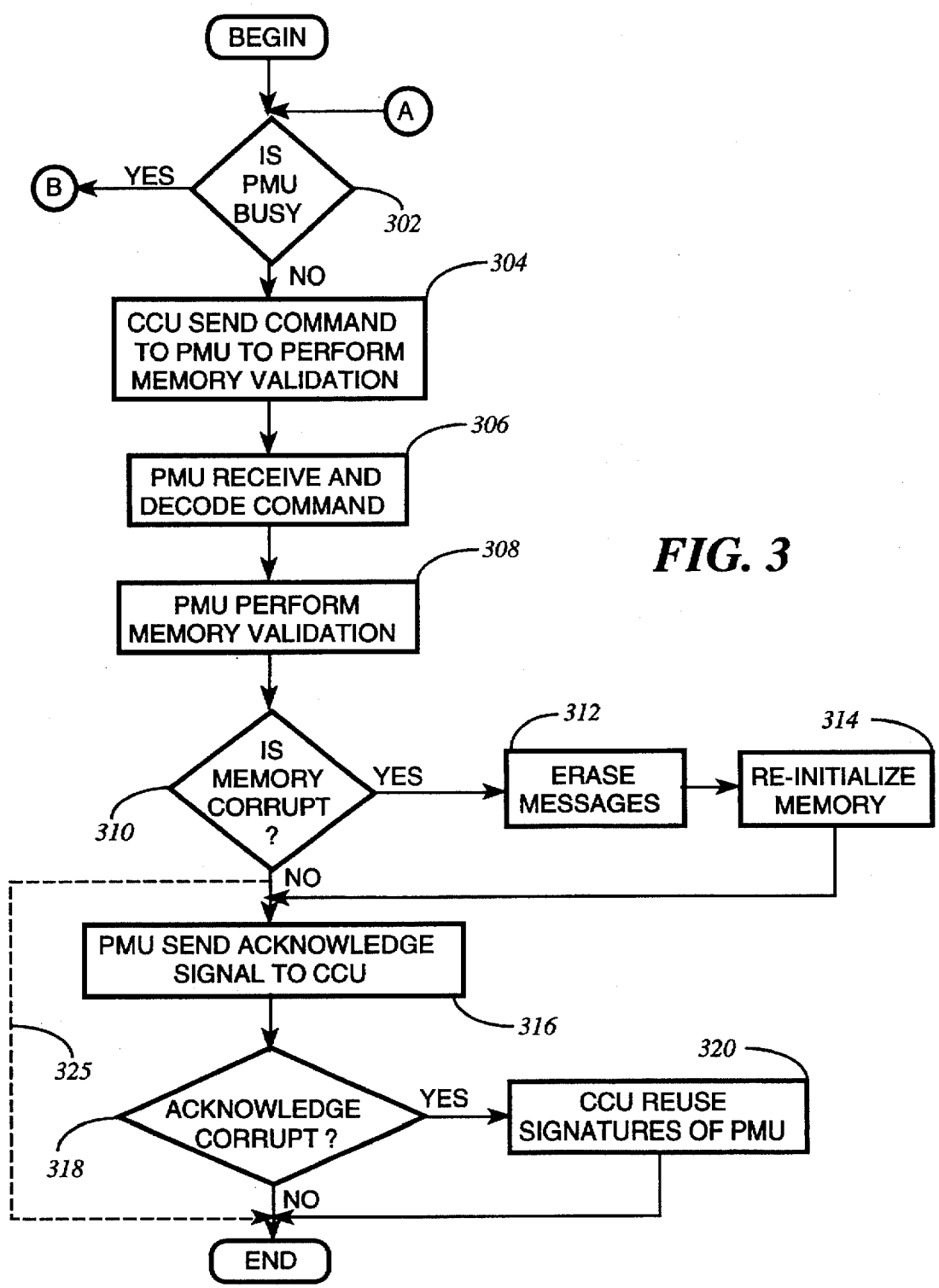
FIG. 3 is a flow diagram representing the memory validation operation during a non-busy condition of the preferred embodiment of the invention.

Specifically, as shown in FIG. 3, in operation, during a non-busy condition, block 302, (i.e., the central control unit is not waiting for a response to a previously sent message), the central control unit will send a signal with a command to the specific PMU to perform memory validation, block 304. Upon receipt and decoding of this command block 306, the PMU performs memory validation, block 308. If a failure occurs, block 310, (i.e., the memory is corrupt) the PMU will automatically erase the memory, block 312, by deleting messages and will re-initialize the memory, block 314. The PMU will then notify the central control unit of whether the memory validation passed or failed with an acknowledge signal, block 316. If the memory failed, the central control unit will know that it can re-use all signatures, block 320, since the memory was re-initialized. If the memory is not corrupt, the PMU can send an acknowledge signal that the memory is not corrupt, block 316. Alternately, as shown by the dotted line 325 in FIG. 3, if the memory is not corrupt, the process may end without sending any signal to the central control unit.

Figure 4:
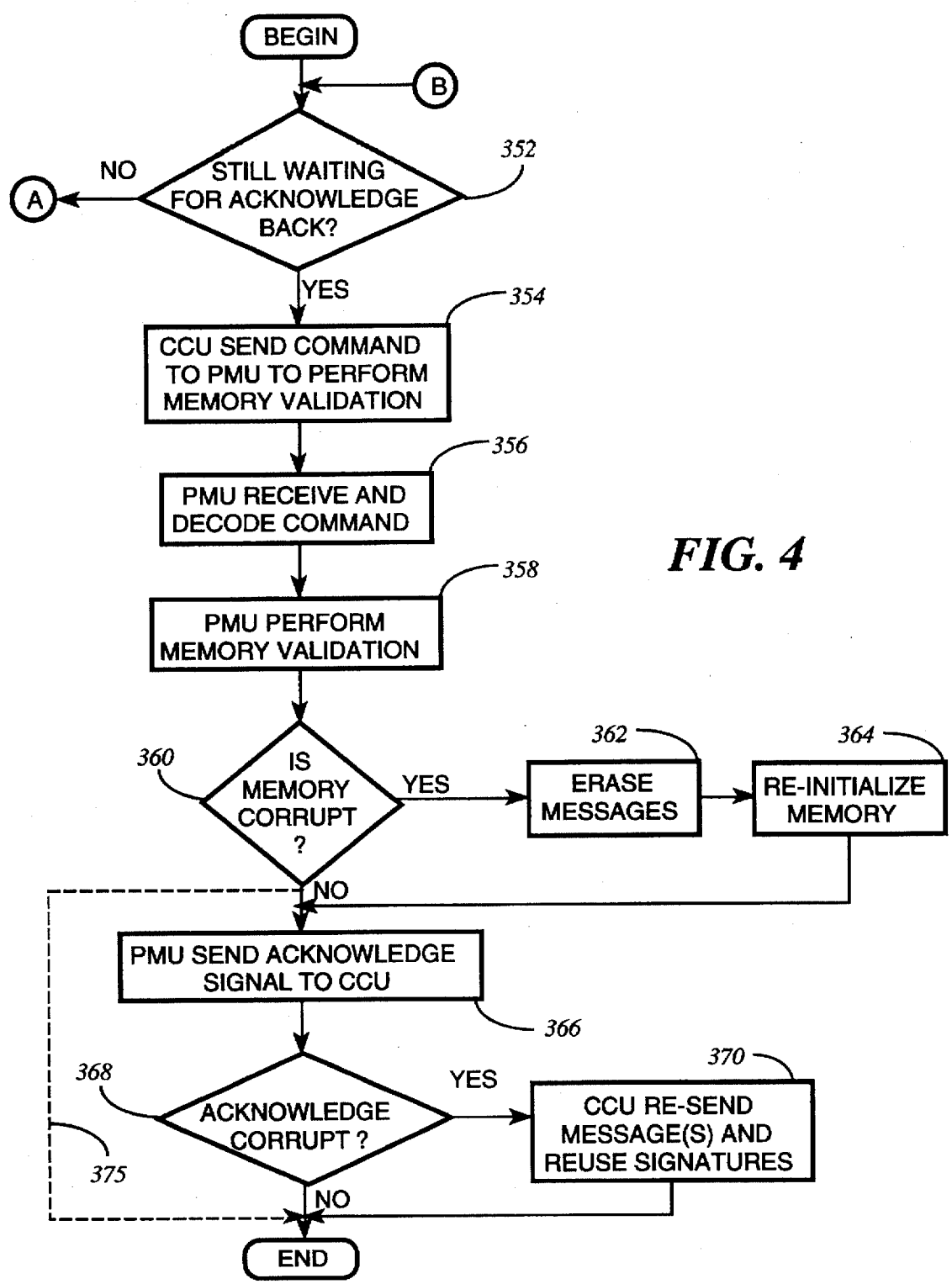
FIG. 4 is a flow diagram representing the memory validation operation during a busy-condition of the preferred embodiment of the invention.

During a busy condition (i.e., the central control unit 200 is waiting for a response from a previously sent message, block 352), as shown in FIG. 4, in a selective call system including a central control unit for transmitting signals to a plurality of remotely located receiving units (PMUs), each receiving unit having an address corresponding thereto and having memory for storing a plurality of received messages, the method for directing validation of the memory, includes the steps of: 1) transmitting from the central control unit a transmission signal including a command directing one of the plurality of receiving units having an address corresponding thereto to perform validation of the memory, block 354; 2) receiving (and decoding) the signal by the one of the plurality of receiving units, block 356; 3) performing memory validation in response to the command on the memory by the one of the plurality of receiving units, block 358; 4) erasing the plurality of received messages stored in the memory, block 362 (including re-initializing memory, block 364) and transmitting a failed memory acknowledge signal, block 366, when the memory validation detects corrupted memory, block 360; and 5) transmitting by the central control unit a subsequent transmission signal, block 370, wherein the subsequent transmission may include a reproduction of at least one of the received messages erased by the receiving unit. Alternately, if the memory is not corrupt, the process can end, as shown by the dotted line 375, or the PMU can send an acknowledge signal, block 366, to the central control unit that the memory validation was successful.

In other words, the central control unit 200 will send a signal with a command to the specific PMU 100 to perform memory validation. Upon receipt and decoding of this command, the PMU 100 performs memory validation. If a failure occurs, the PMU 100 will automatically erase the memory 110 by deleting messages and will re-initialize the memory 110. The PMU 100 will then notify the central control unit 200 of whether the memory validation passed or failed. If the memory validation failed, the central control unit 200 may then determine which messages, if any, need to be resent. Then the central control unit 200 can re-send these messages which will be received by the PMU 100. Further, if the central control unit 200 recognizes that a particular PMU 100 fails often, the central control unit 200 can contact the user to bring the PMU 100 in for repair or replacement depending on the particular situation.

Referring back to FIGS. 1 and 2, the two-way receiver shown may be generally suitable for use with the present invention. The selective call system of a preferred embodiment of the invention, may include a two-way receiver (PMU) 100 which has memory 110 for storing received messages. The invention further includes a means for performing validation of the memory, includes a means for receiving (e.g., antenna 101 and receiver 103) a control transmission signal including a command directing the receiving unit 100 to perform validation of the memory 110; and a means for performing memory validation of the memory 110 in response to the command. The control transmission signal may be transmitted when the receiving unit 100 is idle, when the receiving unit 100 is processing the received messages, or when a central control unit 200 is waiting for an acknowledge signal for a previously sent message.

The selective call system may further include a means for erasing the received messages stored in the memory 110 when the memory validation detects corrupted memory; and a means for transmitting by the receiving unit (e.g., transmitter 104 and antenna 101) a failed memory acknowledge signal when the memory validation detects corrupted memory. The system may further include a means for receiving a subsequent transmission signal. The subsequent transmission may include a reproduction of all of the received messages erased, a reproduction of a most recently sent message, and/or a reproduction of the previously sent message of which the central control unit 200 is waiting for the acknowledge signal.

A number of advantages arise from practice of this method and apparatus for performing memory validation. For example, because the central control unit 200 determines when validation will take place, the validation process will not interfere with the message receiving operation of personal messaging units 100. Furthermore, the process would allow recovery of any deleted messages should the validation fail. Finally, the central control unit 200 can track the status of particular PMUs and notify users of problem units.

Thus, it is apparent that there has been provided, in accordance with the invention, a method and apparatus for method and apparatus for performing memory validation. While the invention has been described and illustrated with reference to specific embodiments thereof, it is not intended that the invention be limited to these illustrative embodiments. Those skilled in the art will recognize, after review of the foregoing description, that variations and modifications differing from the illustrative embodiments are possible. It is intended that all such variations and modifications as fall within the spirit and scope of the invention be included within the appended claims.

What is claimed is:

1. In a selective call system, having at least one receiving unit comprising memory for storing received messages, a method for performing validation of said memory, comprising the steps of:

receiving by said receiving unit a control transmission signal including a command directing said receiving unit to perform validation of said memory;

performing memory validation of said memory by said receiving unit in response to said command;

wherein said method further comprises, when said memory validation detects corrupted memory, the steps of erasing by said receiving unit said received messages stored in said memory; and transmitting by said receiving unit a failed memory acknowledge signal.

2. The method of claim 1, further comprising after said step of transmitting said failed memory acknowledge signal, a step of:

receiving by said receiving unit a subsequent transmission signal.

3. The method of claim 2, wherein said control transmission signal is transmitted when said receiving unit is idle.

4. The method of claim 2, wherein said control transmission signal is transmitted when said receiving unit is processing said received messages.

5. The method of claim 2, wherein said control transmission signal is transmitted when a central control unit is waiting for an acknowledge signal for a previously sent message.

6. The method of claim 5, wherein said subsequent transmission comprises a reproduction of said previously sent message of which said central control unit is waiting for said acknowledge signal.

7. The method of claim 2, wherein said subsequent transmission comprises a reproduction of all of said received messages erased by said receiving unit.

8. The method of claim 2, wherein said subsequent transmission comprises a reproduction of a most recently sent message.

9. In a selective call system including a central control unit for transmitting signals to a plurality of remotely located receiving units, each receiving unit having an address corresponding thereto and comprising memory for storing a plurality of received messages, a method for directing validation of said memory, comprising the steps of:

transmitting from said central control unit a transmission signal including a command directing one of said plurality of receiving units having an address corresponding thereto to perform validation of said memory;

receiving said signal by said one of said plurality of receiving units;

performing memory validation in response to said command on said memory by said one of said plurality of receiving units;

erasing said plurality of received messages stored in said memory and transmitting a failed memory acknowledge signal when said memory validation detects corrupted memory; and transmitting by said central control unit a subsequent transmission signal, wherein said subsequent transmission comprises a reproduction of at least one of said received messages erased by said receiving unit.

10. A selective call system, having at least one receiving unit comprising memory for storing received messages, and a means for performing validation of said memory, comprising:

means for receiving by said receiving unit a control transmission signal including a command directing said receiving unit to perform validation of said memory; and means for performing memory validation of said memory by said receiving unit in response to said command;

means for erasing by said receiving unit said received messages stored in said memory when said memory validation detects corrupted memory; and means for transmitting by said receiving unit a failed memory acknowledge signal when said memory validation detects corrupted memory.

11. The selective call system of claim 10, further comprising:

means for receiving by said receiving unit a subsequent transmission signal.

12. The selective call system of claim 11, wherein said control transmission signal is transmitted when said receiving unit is idle.

13. The selective call system of claim 11, wherein said control transmission signal is transmitted when said receiving unit is processing said received messages.

14. The selective call system of claim 11, wherein said control transmission signal is transmitted when a central control unit is waiting for an acknowledge signal for a previously sent message.

15. The selective call system of claim 14, wherein said subsequent transmission comprises a reproduction of said previously sent message of which said central control unit is waiting for said acknowledge signal.

16. The selective call system of claim 11, wherein said subsequent transmission comprises a reproduction of all of said received messages erased by said receiving unit.

17. The selective call system of claim 11, wherein said subsequent transmission comprises a reproduction of a most recently sent message.

18. The selective call system of claim 10, further comprising:

means for erasing by said receiving unit said received messages stored in said memory when said memory validation detects corrupted memory;

means for transmitting by said receiving unit a failed memory acknowledge signal when said memory validation detects corrupted memory; and means for receiving by said receiving unit a subsequent transmission signal; wherein said subsequent transmission comprises a reproduction of at least one of said received messages erased by said receiving unit.

* * * * *